US012434468B2

(12) United States Patent
Gaidetzka et al.

(10) Patent No.: US 12,434,468 B2
(45) Date of Patent: Oct. 7, 2025

(54) ARRANGEMENT FOR A PRINTING MACHINE AND METHOD FOR PRODUCTION

(71) Applicant: INOMETA GmbH, Herford (DE)

(72) Inventors: Michael Gaidetzka, Bad Salzuflen (DE); Marc Wünsche, Detmold (DE)

(73) Assignee: INOMETA GmbH, Herford (DE)

( * ) Notice: Subject to any disclaimer, the term of this patent is extended or adjusted under 35 U.S.C. 154(b) by 0 days.

(21) Appl. No.: 18/485,024

(22) Filed: Oct. 11, 2023

(65) Prior Publication Data

US 2024/0123726 A1 Apr. 18, 2024

(30) Foreign Application Priority Data

Oct. 12, 2022 (DE) ..................... 10 2022 126 559.5

(51) Int. Cl.

*B41F 3/56* (2006.01)
*B41F 3/48* (2006.01)
*B41F 3/81* (2006.01)
*B41F 5/24* (2006.01)

(52) U.S. Cl.

CPC .................. *B41F 3/56* (2013.01); *B41F 3/48* (2013.01); *B41F 3/81* (2013.01); *B41F 5/24* (2013.01)

(58) Field of Classification Search

CPC ...... B41F 3/56; B41F 3/48; B41F 3/81; B41F 5/24

See application file for complete search history.

(56) References Cited

U.S. PATENT DOCUMENTS 3,696,744 A * 10/1972 Etchell ................ B41F 27/1231 101/415.1
3,946,588 A * 3/1976 Mayston ................ B21D 19/08 72/466.8
4,259,904 A * 4/1981 Metje .................... B41F 27/005 33/618
5,209,163 A * 5/1993 Banike .................... B41F 27/02 101/415.1

(Continued)

FOREIGN PATENT DOCUMENTS

FR 2789626 A1 8/2000
WO 2016/135552 A1 9/2016

OTHER PUBLICATIONS

Machine translation of Office Action in Corresponding German Application No. 10 2022 126 559.5, mailed Jun. 6, 2023.

*Primary Examiner* — David H Banh
(74) *Attorney, Agent, or Firm* — Leason Ellis LLP

(57) ABSTRACT

An assembly for a printing machine includes: a printing plate cylinder, which has a cylinder body; a printing sleeve, which is arranged on an outer surface of the cylinder body; and a transmission device, which has a connecting point on the printing plate cylinder side and a connecting point on the printing sleeve side, which connecting points can be connected by means of a connecting element to form a transmission connection. The connecting element is displaceable between a retracted position, in which the transmission connection is interrupted, and an extended position, in which the transmission connection is formed for at least one of the following types of transmission: transmission of a fluid, transmission of signals and transmission of electrical energy. Furthermore, a method is provided for producing an arrangement for a printing machine.

14 Claims, 8 Drawing Sheets

(56) References Cited

U.S. PATENT DOCUMENTS

| | | | | |
|---|---|---|---|---|
| 6,283,026 | B1 * | 9/2001 | Tocheport | B41F 27/105<br>101/378 |
| 2002/0048982 | A1 * | 4/2002 | Gu | H01R 13/6315<br>439/247 |
| 2008/0105149 | A1 * | 5/2008 | Rogge | B41F 27/14<br>101/375 |
| 2013/0284037 | A1 * | 10/2013 | Rossini | B41F 27/105<br>101/216 |
| 2015/0047898 | A1 * | 2/2015 | Sagdic | H01R 13/506<br>174/657 |
| 2021/0354440 | A1 * | 11/2021 | Schwiertz | B41F 13/08 |

* cited by examiner

ARRANGEMENT FOR A PRINTING MACHINE AND METHOD FOR PRODUCTION

CROSS REFERENCE TO RELATED APPLICATIONS

The present application claims priority under 35 U.S.C. § 119(a) to German Patent Application No. 102022126559.5, titled "ARRANGEMENT FOR A PRINTING MACHINE AND METHOD FOR PRODUCTION" filed on Oct. 12, 2022, which is hereby incorporated by reference as if set forth in its entirety herein.

The invention relates to an arrangement for a printing machine and a method for producing an arrangement for a printing machine.

BACKGROUND

Printing plate cylinders, or printing cylinders for short, are used in printing machines to accommodate at least one printing sleeve, optionally with the use of a printing adapter, or a print image in a supporting manner and thus to form an arrangement for a printing machine. An arrangement of this type with printing plate cylinder and printing sleeve can then be used in a printing machine.

The document DE 10 2004 051 041 B3 discloses a printing plate cylinder which has a movable, male register element, which is in operative connection with an assigned female mating part, for positioning or registering printing adapters.

The document EP 0 782 919 B1 discloses an actuation mechanism inside a printing plate cylinder, which can be driven pneumatically.

The document EP 3 640 031 A1 describes a cylinder with a movable catch, pin or stud which, in a rest position, allows hollow cylinders to slide over it. In an active position, it protrudes beyond the circumferential surface of the cylinder. A catch can be converted from a rest position to an active position and vice versa via a rotational movement. The document EP 3 867 068 A1 discloses similar matter.

The document EP 0 510 744 B1 discloses options for the registration of printing sleeves with the aid of a register device.

In the various documents, means are described which are essentially used for positioning or registering printing sleeves on a cylinder body of the printing plate cylinder. Alternatively, printing sleeves can be equipped with end-side sealing rings in order to seal and therefore to bridge a spatial supply gap, which can be formed as a gap, between printing plate cylinder and printing sleeve with regard to the supplying of compressed air into the printing adapter, as is disclosed for example in the document DE 20 2017 103 425 U1.

SUMMARY

The object of the invention is to provide an arrangement for a printing machine having a printing plate cylinder, and a method for production which allow an improved functional transmission of a fluid, electrical signals and/or electrical energy between printing plate cylinder and a printing sleeve arranged thereon.

An arrangement for a printing machine according to the independent claim 1 and a method for producing an arrangement for a printing machine according to the claim 14 are provided to achieve the object. Embodiments are the subject-matter of dependent claims.

According to one aspect, an arrangement for a printing machine is provided, which comprises the following: a printing plate cylinder which is formed with a cylinder body; a printing sleeve or printing adapter, which is arranged on an outer surface of the cylinder body; and a transmission device, which has a connecting point on the printing plate cylinder side and a connecting point on the printing sleeve side, which connecting points can be connected by means of a connecting element to form a transmission connection. The connecting element is displaceable between a retracted position, in which the transmission connection is interrupted, and an extended position, in which the transmission connection is formed for at least one of the following types of transmission: transmission of a fluid, transmission of signals and transmission of electrical energy.

According to a further aspect, a method is provided for producing an arrangement for a printing machine, the method comprising the following steps: providing a printing plate cylinder having a cylinder body; providing a printing sleeve; arranging the printing sleeve on an outer surface of the cylinder body of the printing plate cylinder in an end position; and bridging the gap by means of a transmission device, wherein a transmission connection which bridges the gap is formed by means of a connecting element of the transmission device between a connecting point on the printing plate cylinder side and a connecting point on the printing sleeve side, and the connecting element is displaced between a retracted position, in which the transmission connection is interrupted, and an extended position, in which the transmission connection is formed, in a manner which bridges the gap between the printing plate cylinder and the printing sleeve, for at least one of the following types of transmission: transmission of a fluid, transmission of signals and transmission of electrical energy.

With the aid of the transmission device, depending on the desired application, a fluid, electrical signals and/or electrical energy can be transmitted efficiently between printing plate cylinder and printing sleeve, which is then arranged thereon. In particular, it is hereby made possible to supply the printing sleeve with the fluid, the electrical signals and/or the electrical energy, which is why a supply device can be provided by means of the transmission device. The connecting element can then also be termed a supply element.

The transmission connection can be configured to transmit electrical and/or optical signals for example. For example, measurement and/or control signals can be transmitted.

The connecting element can be formed with a retractable (lowerable) connecting element on the cylinder body, which connecting element is arranged such in the retracted position that it does not protrude with respect to the outer surface. The lowerable connecting element is here formed or arranged on the cylinder body. The transmission connection between printing plate cylinder and printing sleeve is then produced during the transition between the retracted position and the extended position. The outer surface of the cylinder body may be part of a circumferential surface of the cylinder body. The lowerable connecting element can, in the retracted position, be set back with respect to an opening surface of an opening in which the connecting element is arranged in a displaceable manner.

The retractable connecting element can, in the extended position, be arranged in a protruding manner with respect to the outer surface. Whilst the retractable connecting element, in the retracted position, which may also be termed a rest position, does not protrude above the outer surface of the cylinder body, this changes in the extended position, which may also be termed an active or working position, to the effect that the retractable or lowerable connecting element protrudes above the outer surface.

A gap can be formed between the printing plate cylinder and the printing sleeve, and the gap can be bridged with the transmission connection formed in the extended position of the connecting element.

The gap can for example be formed between the outer surface of the printing plate cylinder and the inner surface of the printing sleeve.

The gap can therefore be bridged with the aid of the transmission device, particularly if the printing sleeve is arranged on the printing plate cylinder in the end position. The connecting element can then be displaced out of the retracted position into the extended position, in order to thus form the transmission connection, bridging the gap between the cylinder body/the outer surface of the cylinder body and the inner surface of the printing sleeve or bridging a gap inside the printing plate cylinder to the inner surface of the printing sleeve, so that the transmission of a fluid, of electrical signals and/or of electrical energy is enabled by means of the transmission connection. Herein or in other embodiments, the transmission connection can be configured for an (optionally unidirectional) transmission from the printing plate cylinder towards the printing sleeve, from the printing sleeve towards the printing plate cylinder or a bidirectional transmission between printing plate cylinder and printing sleeve. With respect to the fluid, a unidirectional transmission can for example be formed using a one-way valve in a fluid connection between printing plate cylinder and printing sleeve.

The size of the gap between printing plate cylinder and printing sleeve can be 0.001 mm to several millimetres.

The retractable connecting element can, in the extended position, be arranged in a protruding manner with respect to the outer surface and bridging the gap. Whilst the retractable connecting element does not protrude above the outer surface of the cylinder body here, in the retracted position, this changes in the extended position to the effect that the retractable connecting element protrudes above the outer surface and thus bridges the gap.

The gap or a spacing (distance) can in an alternative embodiment only be formed between a tip of the connecting element and the outer circumferential surface of the printing plate cylinder. The tip of the connecting element can then dock to an inner tube of the printing sleeve at a bore. The retractable connecting element can then, in the extended position, bridge the spacing (gap) which is formed in the retracted position of the connecting element between the tip of the connecting element and the outer surface of the printing plate cylinder.

A channel may also be provided on the printing sleeve side, which channel is connected in the printing sleeve to the connecting point on the printing sleeve side. Alternatively or additionally, a channel on the printing plate cylinder side can be provided, which is formed in the cylinder body and is connected to the connecting point on the printing plate cylinder side. If the connecting element is arranged in the extended position, the connecting element is in functional connection with the connecting points on the printing plate cylinder side and on the printing sleeve side and therefore with at least one of the channels, so that at least one of the types of transmission can be executed.

The connecting element can have an element channel which is configured to connect, at least in the extended position of the connecting element, to the channel on the printing plate cylinder side and/or the channel on the printing sleeve side. In this manner, a respective channel connection can be formed on the printing plate cylinder side and on the printing sleeve side via the connecting element. The element channel can be configured to bridge the gap, at least in the extended position.

The element channel, the channel on the printing plate cylinder side and/or the channel on the printing sleeve side can be formed in accordance with at least one of the following channel types: fluid channel, line channel and cable duct. The fluid channel is configured for transmitting the fluid and to have said fluid flow through it (flow channel). The line channel is configured to transmit at least signals, for example for data transmission (data signal channel) and may have transmission elements made for example from electrically conductive material for that. An optical transmission of signals may also be provided. The cable duct is configured to accommodate one or more lines or cables, which can be used for transmitting the signals and/or the electrical energy.

The connecting point on the printing plate cylinder side, the connecting point on the printing sleeve side and the connecting element can be configured to form a fluid-conveying connection, for transferring air for example. In one embodiment, the connecting point on the printing plate cylinder side, the connecting point on the printing sleeve side and the connecting element are configured to form a fluid-conveying connection, which bridges the gap.

The connecting point on the printing plate cylinder side, the connecting point on the printing sleeve side and the connecting element can be configured to form an electrically conductive connection. To form the electrically conductive connection, elements made from electrically conductive material on the printing plate cylinder side and on the printing sleeve side can be electrically conductively connected by means of the connecting element. The connecting point on the printing plate cylinder side, the connecting point on the printing sleeve side and the connecting element can, in one embodiment, be configured to form an electrically conductive connection which bridges the gap.

The connecting element can be connected to the connecting point on the printing plate cylinder side and/or the connecting point on the printing sleeve side via a respective sealing element. For example, a respective fluid-tight connection can be formed with the aid of the sealing element.

The gap between the printing plate cylinder and the printing sleeve can extend along at least one of the following directions with respect to the cylinder body: axial direction and radial direction. The transmission connection can be formed substantially transversely to the direction of extent of the gap, so that the transmission connection extends in the radial direction if the gap runs in the axial direction. Alternatively, the transmission connection runs in the axial direction if the gap runs in the radial direction.

For displacement between the retracted and the extended position, the connecting element can be displaceable along at least one of the following directions with respect to the cylinder body: axial direction and radial direction.

The printing plate cylinder can be configured for use in a rotary printing machine, particularly a flexographic printing machine. The printing plate cylinder can also be configured for use in an offset printing machine, a gravure printing machine or a digital printing machine. Flexographic printing is a direct relief printing method, in which flexible printing plates/printing sleeves made from photopolymer or rubber are used on adapters or sleeves. With the aid of flexographic printing, many materials such as for example films, paper, cardboard or the like can be printed on, which cannot be printed on or can only be printed on to a limited extent using other printing methods.

If the transmission connection is configured for compressed-air supply, it may be provided that the outlet opening of the connecting or supply element is smaller than an inlet opening of an air supply inside the printing plate cylinder. As a result, it can be ensured that a sufficiently large (axial) force can be provided, in order to have the connecting or supply element driven out of the cylinder body into the extended position. Thus, a sufficiently high piston force of the connecting element may be present for example, so that a return spring inside the connecting or supply device is compressed and the connecting element can be connected to the printing sleeve for example in as airtight a manner as possible.

The displacement of the connecting element out of the retracted and into the extended position can be executed counter to a restoring force of a reset device. With the aid of the restoring force, the connecting element can, in one embodiment, return from the extended into the retracted position automatically. The reset device can for example be formed by means of a spring element, which provides a spring restoring force. For example, the connecting element can be displaced into the extended position counter to a spring force of a coil spring.

In the end position, the printing sleeve is secured onto the cylinder body with the aid of a register device, for example mounted in a rotationally fixed manner and fixed in the axial direction.

The printing sleeve can be arranged on the printing plate cylinder in a detachable manner, so different printing sleeves can optionally be arranged on the printing plate cylinder.

One or more inner channels can be formed, respectively, in the cylinder body of the printing plate cylinder and/or the printing sleeve, which inner channels are connected to the transmission device at least when the transmission element is displaced into the extended position. In the retracted position, the connecting element of the transmission device may be connected to an inner channel of the cylinder body/the printing sleeve, if the connecting element is arranged on the cylinder body/the printing sleeve.

A tip of the connecting element may be formed with a conical or hemispherical shape and, alternatively, may for example also be formed with a cylindrical or rectangular shape.

In order to prevent leakages during the bridging from the printing plate cylinder to the printing sleeve, either at least one sealing element can be arranged in the printing sleeve or a printing adapter and/or on the tip of the connecting element. A nitrile rubber element or a Fluorine Kautschuk Material element can be used for example as sealing element. The material of the round sealing element may have a Shore A hardness of approximately 70. Fluorine Kautschuk Material is resistant to heat, oil, ageing, abrasion, ozone, fuel and resistant to aggressive chemicals. In addition, the sealing element offers strong sealing and good airtightness for a multiplicity of applications, such as sanitary, machine, hydraulic and pneumatic applications. Alternatively, specifically additively manufactured (by means of 3D printing) sealing elements may likewise find use.

In the case of transmission of electrical energy and/or signals, at least one connecting or supply device may be provided inside a printing plate cylinder, in order to provide both polarities (plus, minus). Here, a base body of the connecting or supply elements can be electrically insulating and an electrically conductive cylindrical pin can be arranged in the interior.

Electrically insulated conductors can be laid in the respective air channels of printing plate cylinder and printing sleeve, which conductors are ultimately connected to the electrically conductive cylindrical pin inside the connecting element.

A receptacle at the printing sleeve may be made up of an electrically insulating sleeve together with an internally arranged electrically conductive cylindrical pin which is in turn respectively connected to an electrically insulated conductor. Thus, it may be ensured that no electric voltage is applied in direct contact with the printing plate cylinder and in the printing sleeve.

Alternatively, a receptacle or a mating part or else the connecting element can be designed for an electrical supply and for a signal supply and for the forwarding of compressed air at the same time.

Using an electrical supply device of this type and/or a signal supply device, sensors, measuring instruments, data processing systems and actuators inside a printing adapter/a printing sleeve can be supplied with power and data can be transmitted to the rotary printing machine. This allows new fields of use for products of this type inside a rotary printing machine, for example for collecting data, particularly operating data, and/or for "predictive analytics".

The embodiments explained previously in connection with the printing plate cylinder may be provided accordingly in connection with the method for producing the arrangement for a printing machine having the printing plate cylinder.

DESCRIPTION OF EXEMPLARY EMBODIMENTS

Further exemplary embodiments are explained in the following with reference to figures of a drawing. In the figures.

Figure 1:
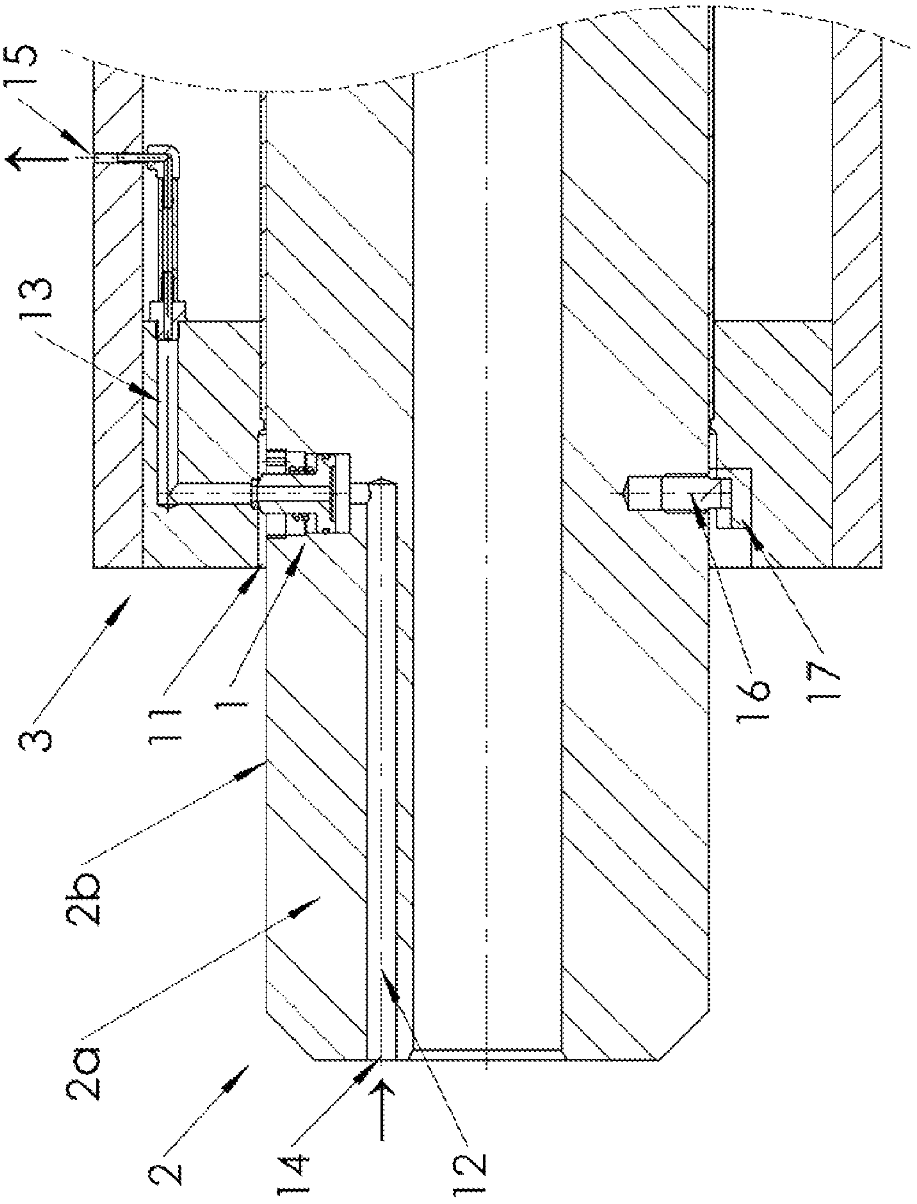
FIG. 1 shows a schematic cross-sectional illustration of a printing plate cylinder having an integrated connecting or supply device and a printing sleeve mounted on the printing plate cylinder.

FIG. 1 shows a schematic illustration of a printing plate cylinder 2 having a cylinder body 2*a*, an integrated transmission or supply device 1 and a printing sleeve 3 mounted on an outer surface 2*b* of the printing plate cylinder 2 in the registered state 16/17, wherein the printing adapter 3 which is also termed a printing sleeve can be supplied with compressed air via the transmission or supply device 1. The transmission or supply device 1 illustrated in FIG. 1 is currently located in a rest position (retracted position) without function, as an air channel 12 is not loaded with compressed air.

Figure 2:
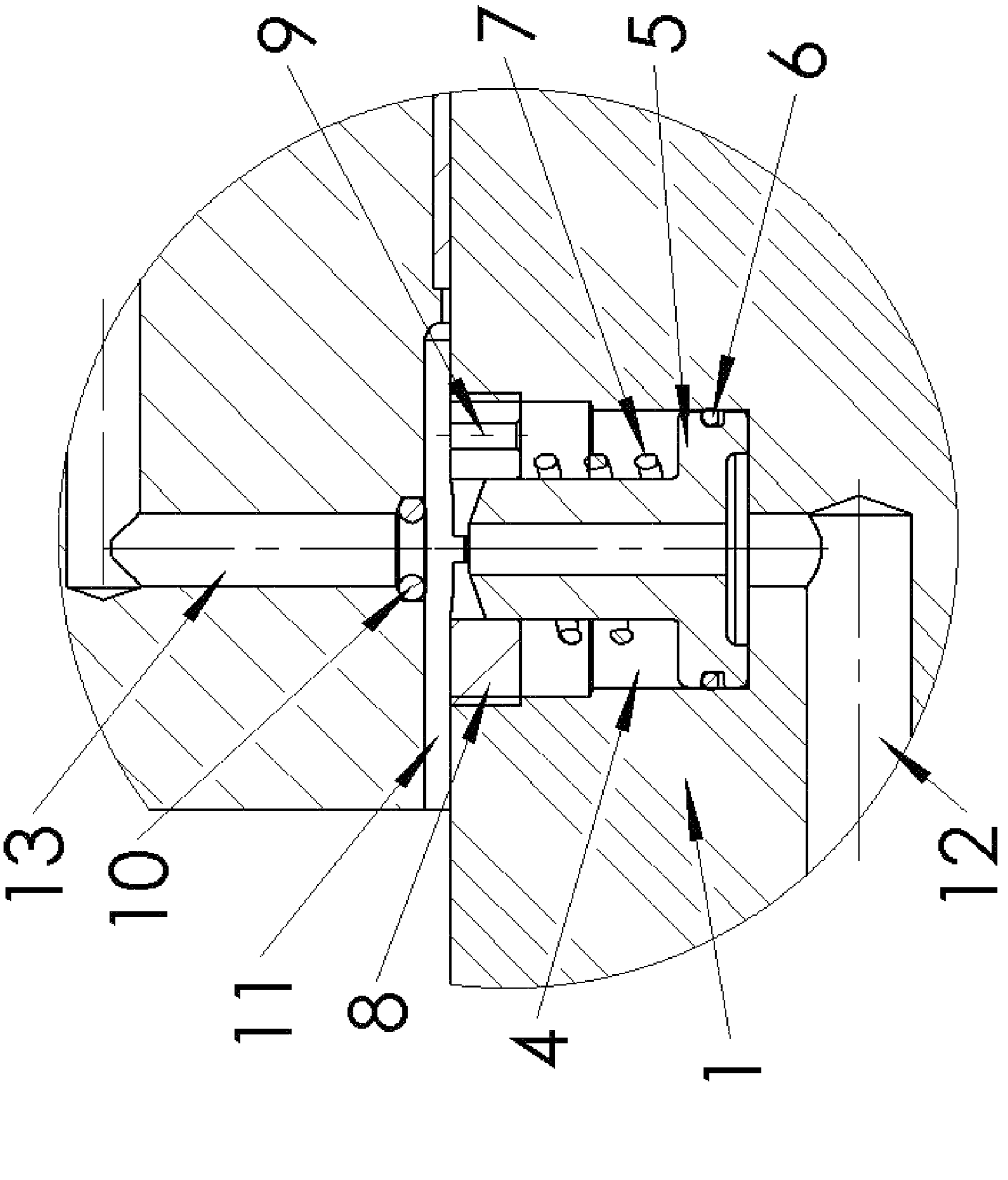
FIG. 2 shows a schematic detail view of the connecting or supply device from FIG. 1 in a retracted position (rest position) in cross section.

FIG. 2 shows a detail view of a radially retractable (lowerable) transmission or supply device 1 in the rest position according to the embodiment in FIG. 1 in cross section. Here, a connecting or supply element 5 is pressed down to the stop by means of a return spring 7 inside a hollow cylinder 4 in operative connection with a screw plug 8. The tip of the connecting element 5 is located in this rest position below the circumferential surface of the printing plate cylinder 2.

Figure 3:
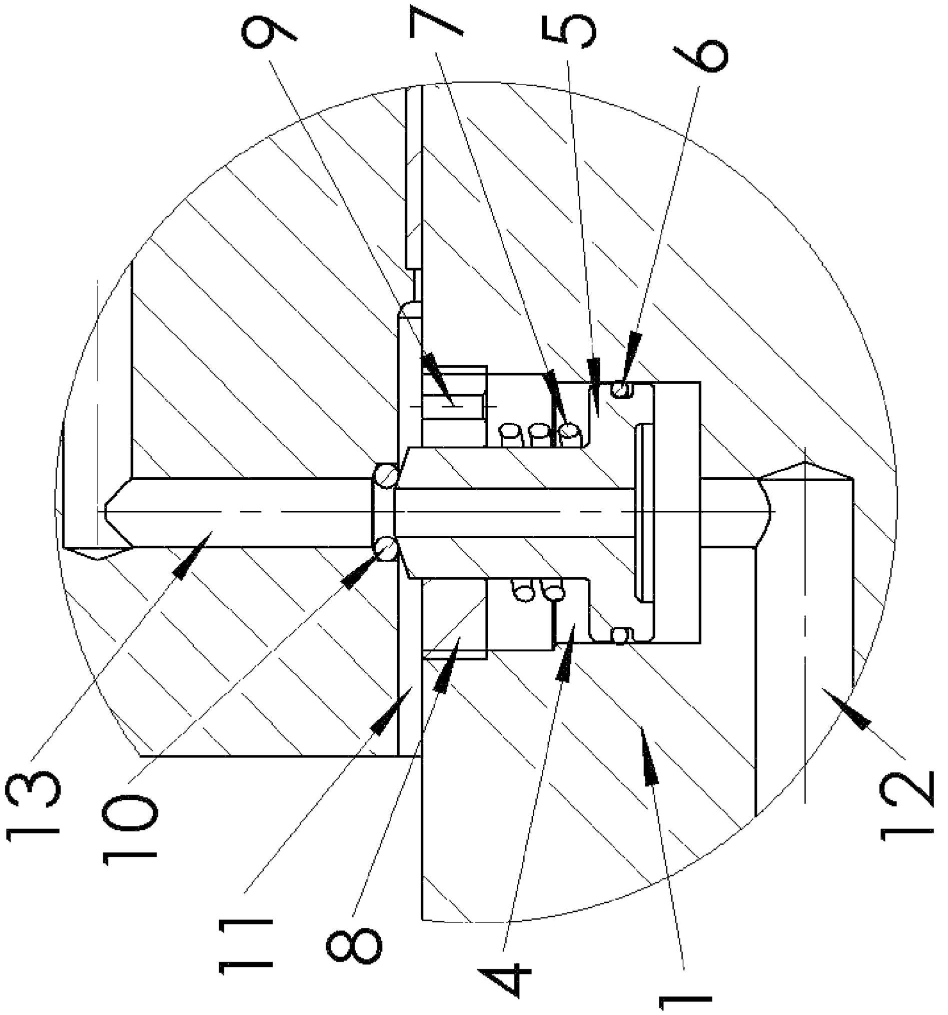
FIG. 3 shows a schematic detail view of the connecting or supply device from FIG. 1 in an extended position (active position) in cross section.

FIG. 3 shows a detail view of a radially retractable transmission or supply device 1 in an active position according to the embodiment in FIG. 1 in cross section. Here, the air channel 12 is loaded with compressed air, so that the connecting or supply element 5 inside the hollow cylinder 4 is guided outwards by the building pressure. Here, the conically formed tip of the connecting element 5 protrudes beyond the screw plug 8 and therefore onto a sealing element 10 of the printing adapter 3. Thus, the printing adapter/the printing sleeve 3 is supplied with compressed air via the transmission or supply device 1. Here, a gap 11 between printing plate cylinder 2 and the printing adapter 3 is bridged with the aid of this transmission or supply device 1. At the same time, the return spring 7 is compressed and the excess (due to volume) air in the intermediate space of the screw plug 8 and the connecting element 5 can escape through an air bleeder hole 9. The tip of the connecting element 5 is located in this active position above the circumferential surface of the printing plate cylinder 2.

Figure 4:
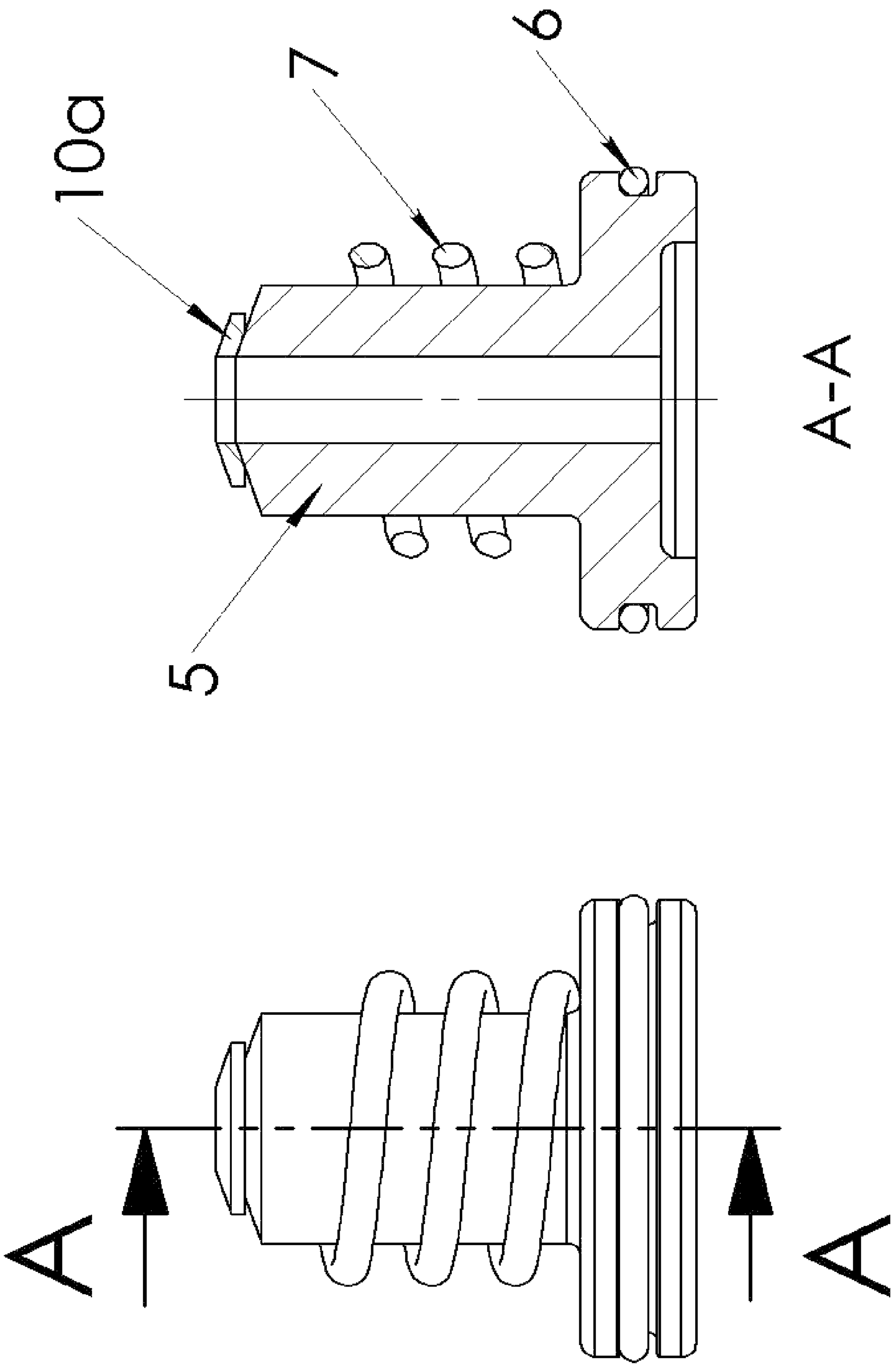
FIG. 4 shows a schematic illustration of the connecting element having a return spring and an O-ring and also an alternative design of the sealing element in the unsectioned and in the sectioned state.

FIG. 4 shows the schematic structure of a connecting element 5 in the unsectioned and in the sectioned view together with a relaxed return spring 7 and with an inserted O-ring 6 and with a sealing element 10*a* on the tip of the connecting element 5. The sealing element 10/10*a* can be arranged either in the accommodating region of the printing adapter 3 or on the tip of the connecting element 5 and also on both sides.

Figure 5:
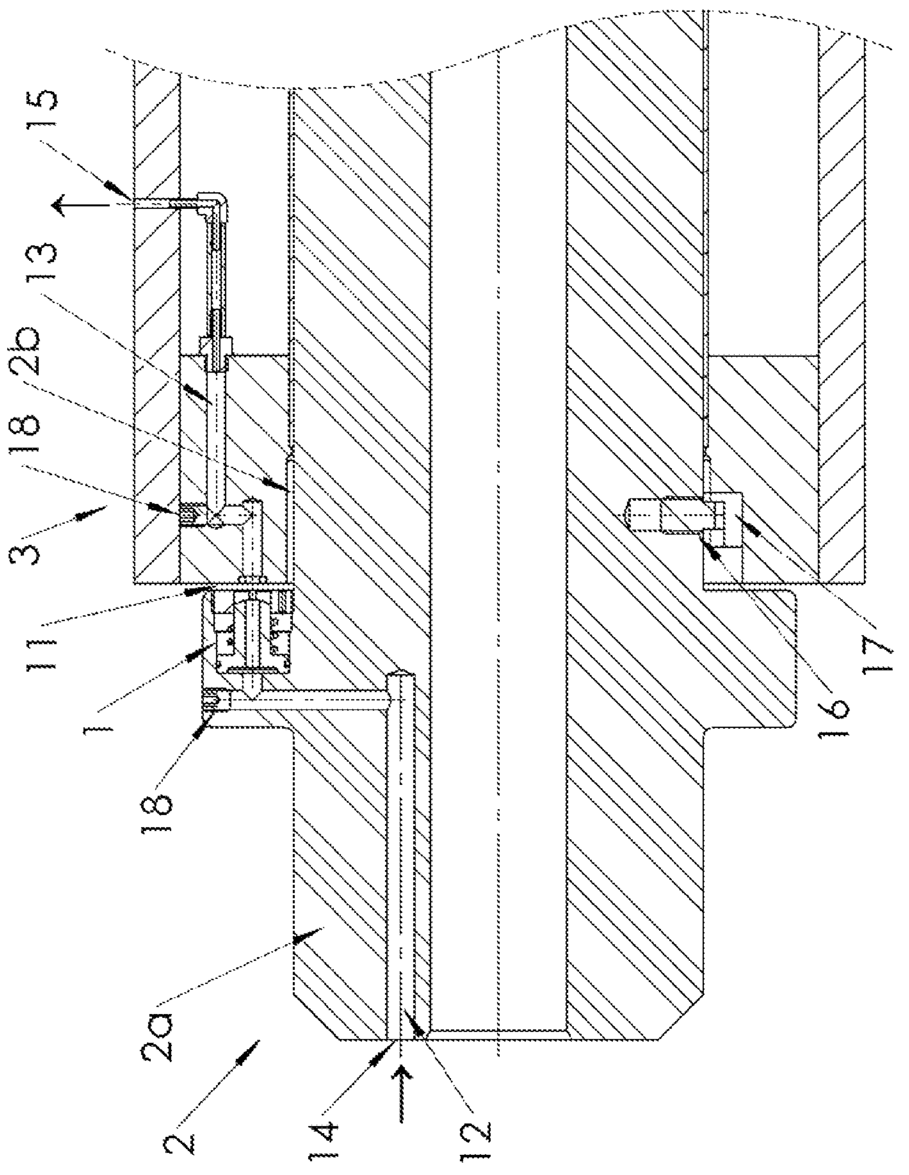
FIG. 5 shows a schematic cross-sectional illustration of a printing plate cylinder having an integrated connecting or supply device and a printing sleeve mounted on the printing plate cylinder, wherein, in contrast to FIG. 1, the connecting or supply device is arranged axially.

FIG. 5 shows a schematically illustrated printing plate cylinder 2 having the integrated transmission or supply device 1 and a printing adapter 3 which is mounted on the printing plate cylinder 2 in the registered state 16/17, wherein the illustrated transmission or supply device 1 is arranged axially in the printing plate cylinder 2.

Figure 6:
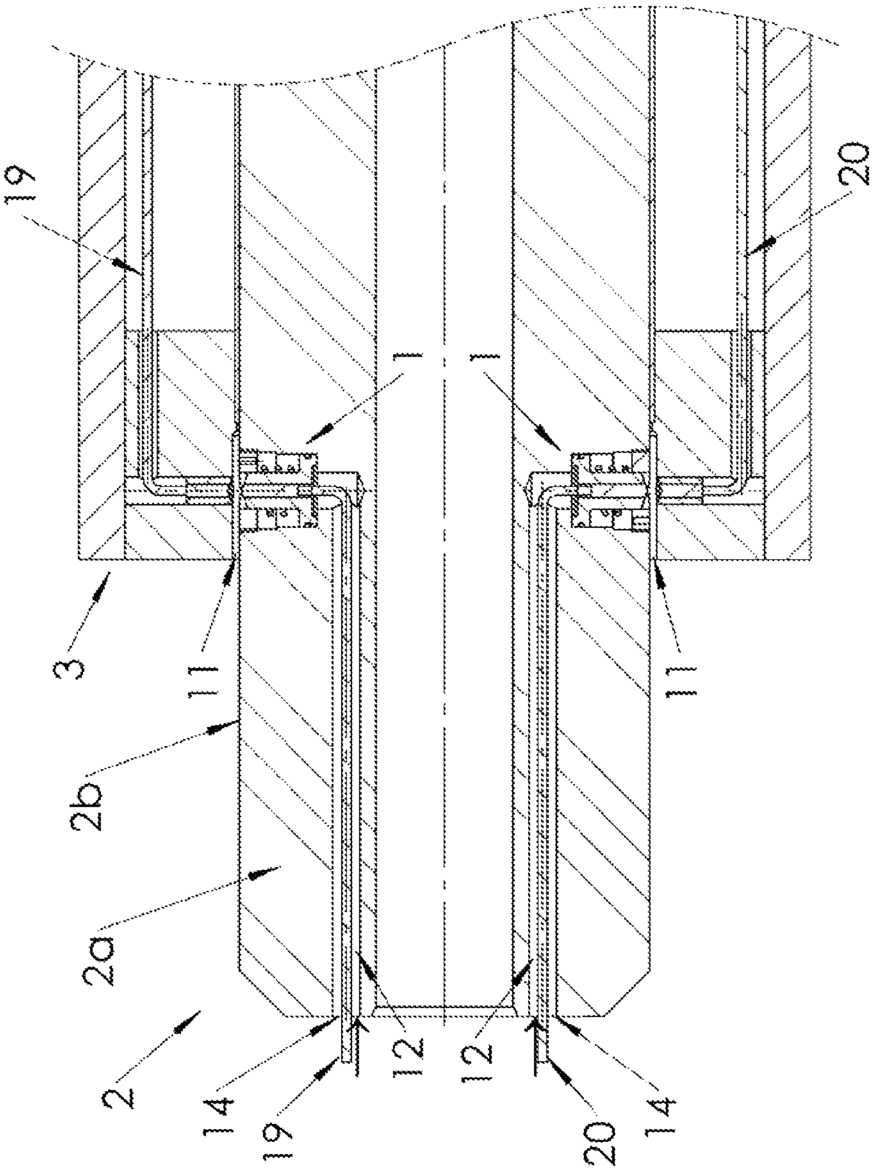
FIG. 6 shows a schematic cross-sectional illustration of a printing plate cylinder having two integrated connecting or supply devices and a printing sleeve mounted on the printing plate cylinder.

FIG. 6 shows a schematically illustrated printing plate cylinder 2 having two integrated transmission or supply devices 1 and a printing adapter 3 which is mounted on the printing plate cylinder 2 in the registered state, wherein the printing adapter 3 is supplied with electrical energy via the transmission or supply devices 1 and/or signals are transmitted. Inside the air channels 12, single-conductor insulated conductors are guided into the respective transmission or supply devices 1, which are connected to the respective connecting or supply element 5. Adapted insulated female mating parts are available in the printing adapter 3, so as to be able to accommodate the connecting elements 5 accordingly.

Figure 7:
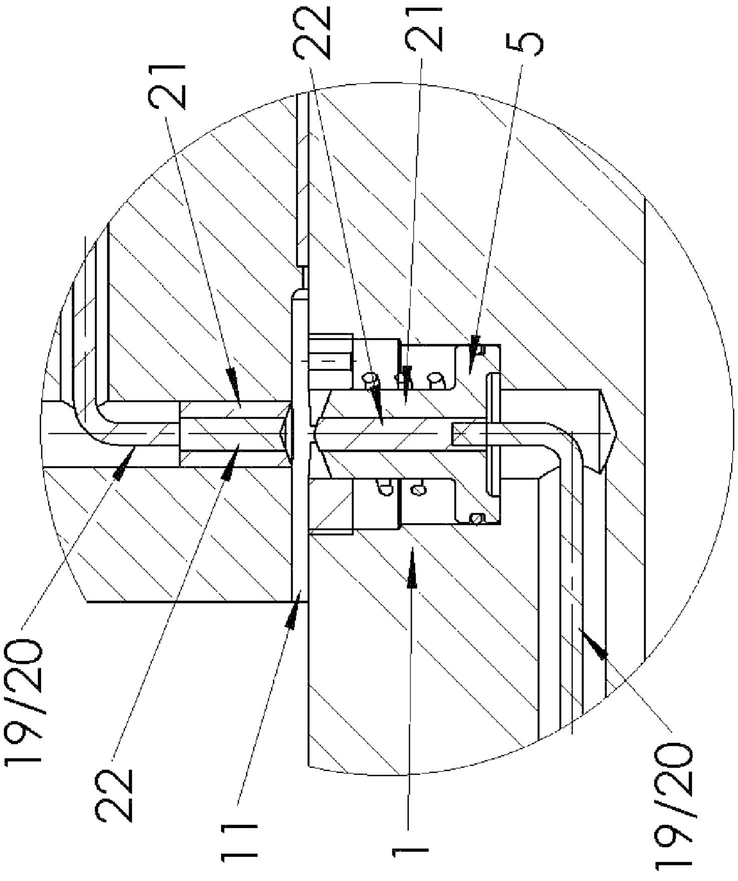
FIG. 7 shows a schematic detail view of the connecting or supply device from FIG. 6 in a retracted position (rest position) in cross section.

FIG. 7 shows a detail view of a radially retractable transmission or supply device 1 in a rest position according to the embodiment in FIG. 6 in cross section, wherein the transmission or supply device 1 is configured for the transmission of electrical energy and/or signals. Inside the air channel 12, here, a one-conductor insulated conductor is guided in the transmission or supply device 1, which is connected to an electrically conductive cylindrical pin 22 inside the connecting element 5. At least one insulated female mating part 21/22 is available in the printing adapter 3, so as to be able to accommodate the connecting element 5 accordingly and ultimately to establish an electrical connection.

Figure 8:
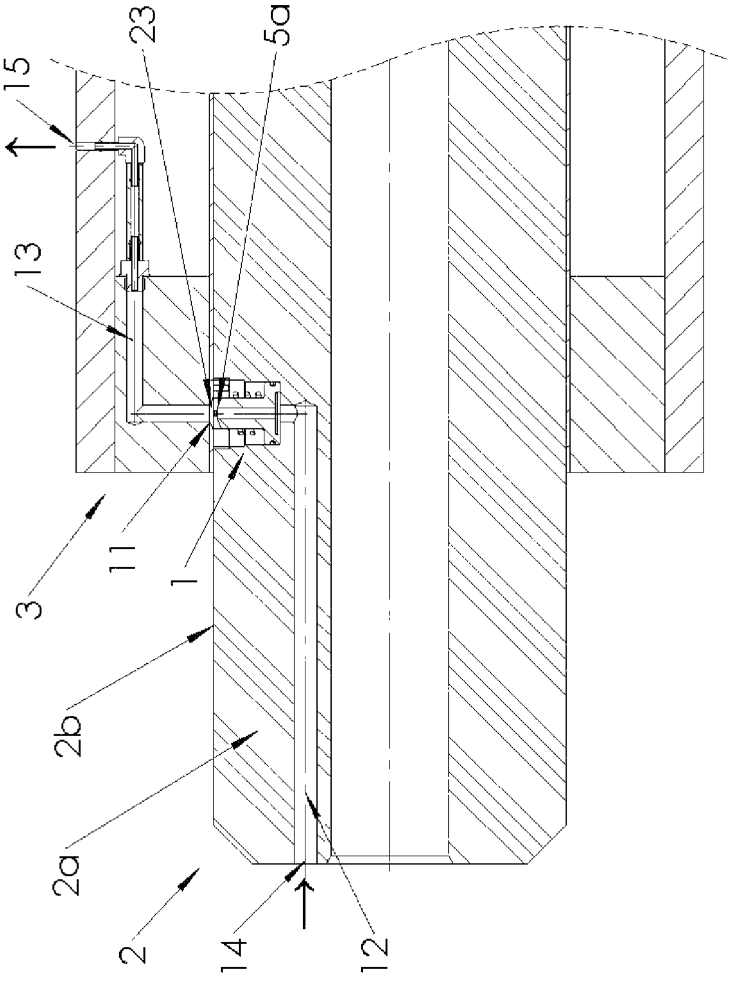
FIG. 8 shows a schematic cross-sectional illustration of a printing plate cylinder having an integrated connecting or supply device and a printing sleeve mounted on the printing plate cylinder in a further design.

FIG. 8 shows a schematic illustration of an alternative embodiment, wherein the same reference numbers are used for the same features as in the preceding figures. The arrangement has a printing plate cylinder 2 having a cylinder body 2*a*, an integrated transmission or supply device 1 and a printing sleeve 3 (printing adapter), which is mounted on an outer surface 2*b* of the printing plate cylinder 2, in an end position. The printing adapter 3 can be supplied with compressed air via the transmission or supply device 1. An inner tube of the printing adapter 3 is formed continuously here as far as the front edge of the printing adapter 3.

A gap 11 is formed in this embodiment inside the printing plate cylinder 2 if the connecting element 5 is arranged in the retracted position, as shown in FIG. 8, and extends within the cylinder body 2*a* from a front tip 5*a* of the connecting element 5 to the outer surface 2*b* on which the inner surface of the printing adapter 3 is in physical contact. In the extended position, the connecting element bridges this gap 11 (this distance), in order to thus form the transmission connection.

The transmission or supply device 1 illustrated in FIG. 8 is located in a rest position (retracted position) without function, as an air channel 12 is not currently loaded with compressed air.

A countersunk hole 23 in the inner tube of the connecting point of the printing sleeve 3 on the printing sleeve side can be dispensed with in an alternative embodiment and substituted by a simple drilled hole and/or in combination with a sealing element, which are not illustrated in FIG. 8.

The features disclosed in the above description, the claims, and the drawing may be of significance both individually and in any desired combination for the implementation of the different embodiments.

REFERENCE LIST

- 1 Transmission or supply device
- 2 Printing plate cylinder
- 2*a* Cylinder body of the printing plate cylinder
- 2*b* Outer surface of the cylinder body
- 3 Printing sleeve/printing adapter
- 4 Hollow cylinder
- 5 Connecting or supply element
- 5*a* Front tip of the connecting or supply element
- 6 Sealing element or O-ring
- 7 Spring element/return spring
- 8 Screw plug
- 9 Air bleeder hole in the screw plug
- 10 Sealing element in the printing adapter
- 10*a* Sealing element on the supply element/piston
- 11 Gap/supply gap

12 Air channel in the printing plate cylinder
13 Air channel in the printing adapter
14 Air inlet opening in the printing plate cylinder
15 Air outlet opening in the printing adapter
16 Register pin in the printing plate cylinder
17 Register groove/register insert in the printing adapter
18 Grub screw/stopper
19 Cable—single-conductor (for example minus line or signal line)
20 Cable—single-conductor (for example plus line or signal line)
21 Electrical insulation
22 Electrically conductive cylindrical pin
23 Countersunk hole

The invention claimed is:

1. An assembly for a printing machine, comprising
a printing plate cylinder which has a cylinder body;
a printing sleeve, which is arranged on an outer surface of the cylinder body; and
a transmission device which has a connecting point on the printing plate cylinder side and a connecting point on the printing sleeve side, which connecting points can be connected using a connecting element to form a transmission connection between the printing plate cylinder and the printing sleeve;
the connecting element being displaceable between a retracted position, in which the transmission connection is interrupted, and an extended position, in which the transmission connection is formed between the printing plate cylinder and the printing sleeve for at least one of the following types of transmission: transmission of a fluid, transmission of signals and transmission of electrical energy.

2. The assembly according to claim 1, wherein the connecting element is formed with a retractable connecting element on the cylinder body, which connecting element is arranged such that, in the retracted position, it does not protrude with respect to the outer surface.

3. The assembly according to claim 2, wherein the retractable connecting element is arranged such that, in the extended position, it protrudes with respect to the outer surface.

4. The assembly according to claim 1, wherein a gap is formed between the printing plate cylinder and the printing sleeve and the transmission connection formed in the extended position of the connecting element bridges the gap.

5. The assembly according to claim 1, further comprising at least one of the following channels:
a channel on the printing sleeve side, which is formed in the printing sleeve and is connected to the connecting point on the printing sleeve side; and
a channel on the printing plate cylinder side, which is formed in the cylinder body and is connected to the connecting point on the printing plate cylinder side.

6. The assembly according to claim 5, wherein the connecting element has an element channel which is configured to connect, at least in the extended position of the connecting element, to the channel on the printing plate cylinder side and/or the channel on the printing sleeve side.

7. The assembly according to claim 6, wherein the element channel and the channel on the printing plate cylinder side and/or the channel on the printing sleeve side are designed in accordance with at least one of the following channel types: fluid channel, line channel and cable duct.

8. The assembly according to claim 7, wherein the connecting point on the printing plate cylinder side, the connecting point on the printing sleeve side and the connecting element are configured to form a fluid-conveying connection.

9. The assembly according to claim 1, wherein the connecting point on the printing plate cylinder side, the connecting point on the printing sleeve side and the connecting element are configured to form an electrically conductive connection.

10. The assembly according to claim 1, wherein the connecting element is connected to the connecting point on the printing plate cylinder side and/or the connecting point on the printing sleeve side via a respective sealing element.

11. The assembly according to claim 1, wherein, for displacement between the retracted and the extended position, the connecting element is displaceable along at least one of the following directions with respect to the cylinder body: axial direction and radial direction.

12. The assembly according to claim 1, which is configured for use in a rotary printing machine, particularly a flexographic printing machine.

13. A method for producing an assembly for a printing machine, comprising
providing a printing plate cylinder having a cylinder body;
providing a printing sleeve;
arranging the printing sleeve on an outer surface of the cylinder body of the printing plate cylinder in an end position; and
bridging a gap between the printing plate cylinder and the printing sleeve by means of a transmission device, wherein
a transmission connection which bridges the gap between the printing plate cylinder and the printing sleeve is formed between a connecting point on the printing plate cylinder side and a connecting point on the printing sleeve side using a connecting element of the transmission device, and
the connecting element is displaced between a retracted position, in which the transmission connection is interrupted, and an extended position, in which the transmission connection is formed between the printing plate cylinder and the printing sleeve for at least one of the following types of transmission: transmission of a fluid, transmission of signals and transmission of electrical energy.

14. The assembly according to claim 3, wherein the gap between the printing plate cylinder and the printing sleeve extends along at least one of the following directions with respect to the cylinder body: axial direction and radial direction.

* * * * *